United States Patent
Nebreda De La Iglesia et al.

(10) Patent No.: US 10,094,510 B2
(45) Date of Patent: Oct. 9, 2018

(54) FIXING ASSEMBLY OF A WINDOW REGULATOR PULLEY

(71) Applicant: GRUPO ANTOLIN-INGENIERIA, S.A., Burgos (ES)

(72) Inventors: Felix Nebreda De La Iglesia, Burgos (ES); David Gomez Camara, Burgos (ES)

(73) Assignee: GRUPO ANTOLIN-INGENIERIA, S.A., Burgos (ES)

( * ) Notice: Subject to any disclaimer, the term of this patent is extended or adjusted under 35 U.S.C. 154(b) by 0 days.

(21) Appl. No.: 14/722,520

(22) Filed: May 27, 2015

(65) Prior Publication Data
US 2015/0345697 A1 Dec. 3, 2015

(30) Foreign Application Priority Data

Jun. 2, 2014 (EP) .................................. 14382210

(51) Int. Cl.
*F16M 13/02* (2006.01)
*E05F 11/48* (2006.01)

(52) U.S. Cl.
CPC ........... *F16M 13/02* (2013.01); *E05F 11/483* (2013.01); *E05Y 2201/668* (2013.01); *E05Y 2201/706* (2013.01); *E05Y 2600/626* (2013.01); *E05Y 2800/676* (2013.01); *E05Y 2800/682* (2013.01); *E05Y 2900/55* (2013.01)

(58) Field of Classification Search
CPC . F16M 13/02; E05F 11/483; E05Y 2201/668; E05Y 2201/706; E05Y 2800/682; E05Y 2800/676; E05Y 2900/55
See application file for complete search history.

(56) References Cited

U.S. PATENT DOCUMENTS

| | | | | |
|---|---|---|---|---|
| 2,359,027 A | * | 9/1944 | Flynn ....................... | B66D 3/04 254/401 |
| 2,364,224 A | * | 12/1944 | Adolph .................... | B66C 23/22 182/55 |
| 2,502,570 A | * | 4/1950 | Johnson .................. | B66D 3/046 254/402 |
| 2,622,846 A | * | 12/1952 | Bennett ................... | E21B 19/02 254/402 |

(Continued)

FOREIGN PATENT DOCUMENTS

| | | |
|---|---|---|
| DE | 202005017112 U1 | 3/2007 |
| DE | 102008060180 A1 | 6/2010 |

(Continued)

*Primary Examiner* — Michael E Gallion
(74) *Attorney, Agent, or Firm* — Ajay A. Jagtiani; Miles & Stockbridge P.C.

(57) ABSTRACT

The assembly allows the fixing of a pulley to a base and comprises a pulley and a support comprising a cylindrical shaft and a connecting element which can be connected to the base. The assembly comprises a support piece with a fixing part with a fixing orifice, and a support part the cylindrical shaft being secured by a second end to the support piece through the fixing orifice, and the support piece being in turn supported by the base through the support part which is designed to rest on the base, so that the cylindrical shaft is supported through its first end joined to the connecting element and its second end through the support piece, and so that the pulley is retained between the base and the support piece.

8 Claims, 11 Drawing Sheets

(56) References Cited

U.S. PATENT DOCUMENTS

| | | | | |
|---|---|---|---|---|
| 3,055,639 | A * | 9/1962 | Chaft | B66D 3/04 254/394 |
| 4,079,916 | A * | 3/1978 | Einhorn | B66D 3/04 2/909 |
| 4,428,250 | A * | 1/1984 | Becker | E05F 15/689 254/362 |
| 4,770,056 | A * | 9/1988 | Becker | E05F 11/483 49/352 |
| 5,027,670 | A * | 7/1991 | Adam | E05F 15/697 277/402 |
| 5,040,430 | A * | 8/1991 | Adam | E05F 11/483 49/349 |
| 6,032,415 | A * | 3/2000 | Tajima | E05F 15/697 49/26 |
| 6,227,993 | B1 * | 5/2001 | Medebach | E05F 11/382 474/144 |
| 6,574,922 | B2 * | 6/2003 | Velthaus | E05F 15/689 296/146.7 |
| 6,908,074 | B2 * | 6/2005 | Eiwan | B66D 3/043 254/390 |
| 8,602,174 | B2 * | 12/2013 | Aulanko | B66B 15/02 187/266 |
| 8,631,607 | B2 * | 1/2014 | Broadhead | B60J 5/0416 254/278 |
| 8,763,993 | B2 * | 7/2014 | Bohler | B66C 1/34 254/390 |
| 2003/0074842 | A1 * | 4/2003 | Eckhardt | E05F 15/689 49/349 |
| 2003/0140562 | A1 * | 7/2003 | Staser | E05F 11/382 49/352 |
| 2006/0091274 | A1 * | 5/2006 | Asamarai | F16M 11/10 248/292.11 |
| 2008/0222962 | A1 * | 9/2008 | Staser | B60J 5/0416 49/502 |
| 2008/0244982 | A1 * | 10/2008 | Azuma | E05F 15/646 49/352 |
| 2009/0188167 | A1 * | 7/2009 | Maruyama | E05F 11/483 49/347 |
| 2011/0010999 | A1 * | 1/2011 | Broadhead | B60J 5/0416 49/352 |
| 2011/0078957 | A1 * | 4/2011 | Deschner | B60J 5/0416 49/352 |
| 2015/0251525 | A1 * | 9/2015 | Atomura | E05F 15/655 49/360 |

FOREIGN PATENT DOCUMENTS

| | | |
|---|---|---|
| DE | 102008060182 A1 | 6/2010 |
| WO | 2009141401 A1 | 11/2009 |
| WO | 2014010545 A1 | 1/2014 |

* cited by examiner

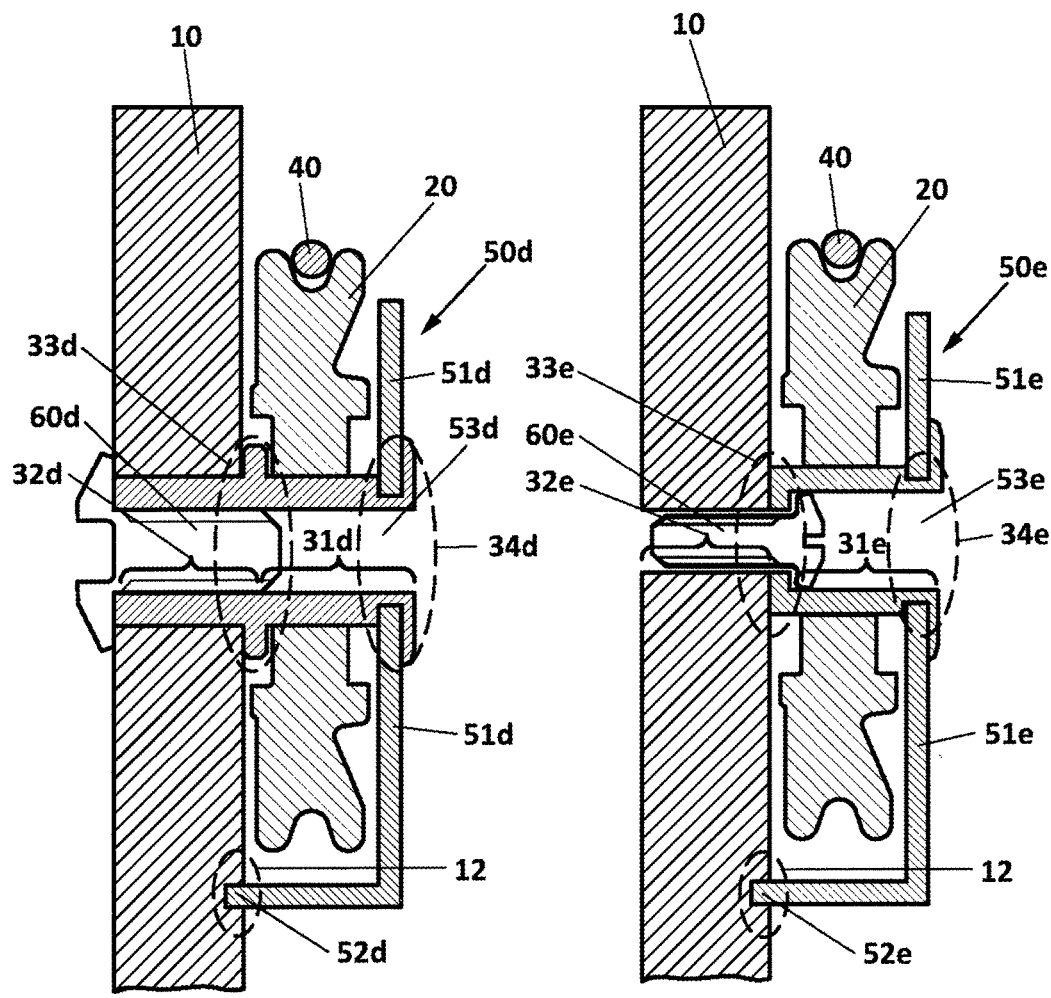

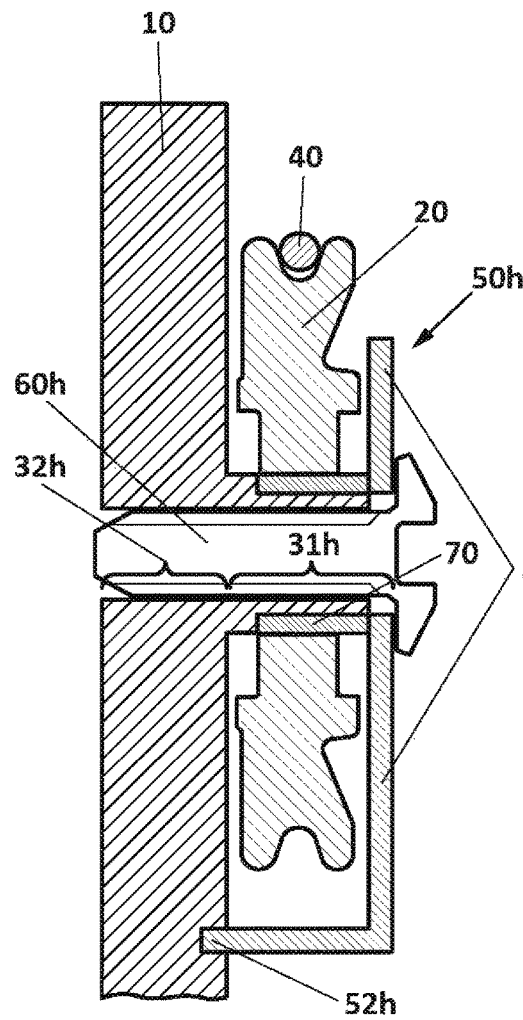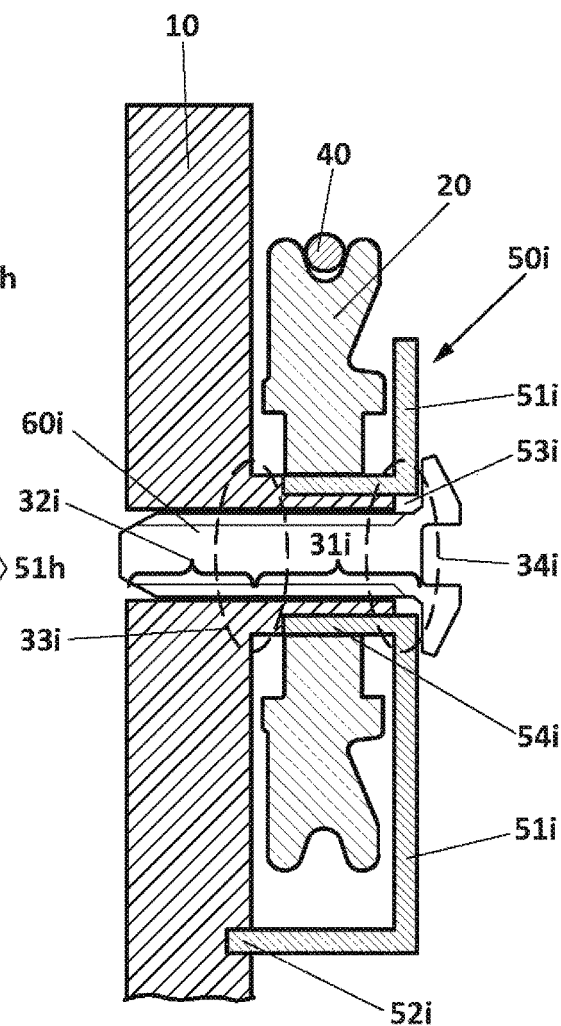

FIXING ASSEMBLY OF A WINDOW REGULATOR PULLEY

TECHNICAL FIELD

The present invention is included in the field of cable window regulators mounted on any type of support element, especially in the case of window regulators mounted on a thermoplastic support element, and more specifically, to the fixing of pulleys in the redirectioning elements of window regulator cables.

BACKGROUND OF THE INVENTION

Window regulators of motor vehicles comprise various components designed for the raising and lowering of the pane in a window door. A window regulator is generally composed of two rails—traditionally metallic—along which slide members which secure the pane slide; the slide members are driven by actuation means manually or in motorized form, said slide members are joined to the actuation means by cables, these cables are made to pass along pulleys, which in addition to transmitting the force exerted by the actuation means, re-direct the cables which drive the slide members in order that they slide in upward or downward direction, pulling the pane. The pulleys are fixed to a base, normally a rail, through a support element with cylindrical form which acts as rotation shaft of the pulley and withstands the forces.

Each slide member is joined to the ends of two of the cables, so that when one of the cables pulls by one of its ends, the slide member moves in one direction, whilst when the other cable pulls by the other end, the slide member moves in the opposite direction.

Typically, the vehicle door is composed of a generally metal structure, different mechanisms and a door lining. Forming part of the metal structure there is a door frame, designed to house therein different mechanisms, among which we can find the window regulator, loudspeaker, lock, wiring, etc. . . . . The side of the door frame which looks towards the exterior of the vehicle is composed of a metal sheet with small orifices, basically to house the lock cylinder and the door handle. The side of the door frame which is in the inner part of the vehicle may have one or several cavities which enable the introduction and fixing of the different mechanisms, a free area remaining under the door frame, so that the pane can rise and lower without finding any obstacle in its path. To cover the cavities of the door frame inside the vehicle, the door lining is placed which, in addition to having an aesthetic and safety purpose, is the support element of some door components.

More recently is known another mounting solution called door module, composed of a pre-mounted assembly formed by a window regulator and other door components, such as, for example; a loudspeaker, a lock, wiring, etc. in this way facilitating the mounting of the assembly inside the door. The side of the door frame inside the vehicle has a sufficiently large orifice to allow the passage of the assembly which must be positioned, in a single operation, inside the door frame and later fixed to the door module.

At present, thanks to the development of thermoplastic polymers, both the window regulator bases and the door module bases can be manufactured in thermoplastic material. An advantage of using this type of materials is that it allows many design possibilities allowing a reduction both in weight and price and also enabling geometries which would be difficult to achieve with metal materials, also achieving compact and modular designs, wherein some window regulator components can be integrated, as well as other door components, reducing the number of components and their manufacturing and assembly cost.

The use of thermoplastic polymers as manufacturing materials makes it possible to achieve different degrees of integration, making the design more flexible and offering greater adaptation to a large variety of doors and configurations.

However, thermoplastic materials are less resistant than metal materials. To obtain a mechanical behaviour of a window regulator or of a module with thermoplastic components, similar to that obtained with metal materials, it is necessary to adapt the design and reinforce the assembly, for example adding ribs or giving the component walls greater thickness, penalizing part of the saving obtained by the use of thermoplastic materials. The smaller resistance of the thermoplastic materials become more critical in force concentration areas, such as, for example, in the fixing points of the pulley support elements to the bases. Furthermore, this effect is intensified with the temperature changes, becoming critical when more extreme temperatures are reached within the habitual temperatures required of the vehicles and in particular the window regulator (between −30° C. and 90° C.), wherein the thermoplastic materials suffer an important loss of mechanical properties.

For these reasons and with the possibility that both factors, force concentration points and extreme temperatures coincide in time increasing in this way the probabilities of breaking of the pulley support elements, it becomes necessary to adopt a solution which allows the distribution of forces concentrated in certain points, so that the extreme temperature changes are additionally no longer a critical factor.

In FIG. 1A an example is shown of how a pulley 20 is typically fixed to a base 10 by means of a support element 30. The support element 30 is normally composed of two parts, a cylindrical shaft 31 around which the pulley 20 rotates and an extension thereof which is a connecting element 32 fixed in a connecting area 11 of the base 10, with the cylindrical shaft 31 having a first end 33 and a second end 34.

As shown in this FIG. 1A, during operation of the window regulator, the cable 40 which drags the pane generates a force T, which is transmitted to the base 10 through the pulley 20 and the support element 30, which causes that in the material of the base 10, in the connecting area 11 with the support element 30, appear resulting forces from the reaction R which compensates the force T of the cable 40. As a consequence of the pulley thickness, the centre of action of the force T, transmitted through the pulley 20, is displaced a distance d with respect to the reaction R generated in the base 10, and therefore, generating a torque M which means the support element 30 tends to tilt, which is also supported by the material of the base 10, where additionally to the reaction R a reactive torque $M_R$ is generated so that the material of the base 10, in the connecting area 11 with the support element 30, must have sufficient rigidity to be capable of maintaining the operating position of the support element 30 and, therefore, of the pulley 20.

In FIG. 1B it is shown what occurs when during operation of the window regulator the cable 40 is subjected to a force T, and, as a consequence, a reaction R and a reactive torque $M_R$ appear in the base 10 in the connecting area 11, generating forces in the material of said area which must be withstood by the material of the base 10. As thermoplastic materials are used in its manufacturing, with less mechanical properties than the metal materials, we obtain a base 10 with less rigidity so that, against the same cable forces 40, greater deformations are produced, giving rise to a greater tilting of the support element 30, and as a consequence an increase of the distance between the centre of action of the force T to a greater value d', which is transmitted through the pulley 20, and that of the reaction R, also therefore increasing the resulting torque $M_R$ to a greater value $M'_R$, so that the forces withstood by the material of the base 10 in the connecting area 11 also increase.

When said forces are close to the elastic limit of the material of the base 10, this effect causes the forces to increase in the connecting area 11 of the base 10. This effect is fed back whilst the force T acts, until reaching a point wherein the elastic limit of the material of the base 10, the reactive torque $M_R$ cannot continue to increase, as the material goes from being in the area of elastic material and entering the plastic area, so that the difference between the resulting torque M' and the resulting reactive torque $M'_R$ increases rapidly, producing the breaking of the material. The fact that the thermoplastic materials have a lower elastic limit than that of the metals increases the probability that this problem appears.

The elastic limit of the material determines the amount of forces it is capable of withstanding and decreases with temperature, i.e. it becomes lower as the temperature of said thermoplastic material increases. For that reason, forces which in normal operating conditions would not cause breaking of the material could in certain cases produce damages more easily, in the form of permanent deformations or breakings in the area of the support element 30.

In short, once the elastic limits of the material has been exceeded, if the force T of the cable 40 is maintained, permanent deformations would occur, weakening the structure and a permanent damage that tends to increase progressively, even causing breakage.

Different solutions are known wherein, with the aim of resolving the problem posed, elements are included with the objective of giving greater rigidity to the connection of the pulley support element to the base.

In patent document WO-2009/141401-A1, a solution is used comprising an intermediate metal part situated between the pulley and the base, which reinforces the connecting area between the shaft and the base, thus securing the corresponding end of the shaft, leaving the other end free, and with a flange which rests against a series of reinforcing ribs in the rail, so that when the cable pulls the pulley with a force T, the base in collaboration with the intermediate part is capable of withstanding the forces generated in the connecting area between the shaft and the base.

Patent document WO-2014/010545-A1 presents a solution which consists of a pulley support structure for a window regulator, formed by a pulley support element and a perforated shaft, capable of securely holding the pulley. The shaft is formed by a perimetral groove on the surface of one of is ends and the pulley support element consists of an orifice, the edge whereof elastically fits into the shaft groove, the perforated shaft and the pulley support element thus being mechanically linked, the pulley support structure is pre-positioned in the base of the window regulator, thanks to projections in the space which coincide with the perforations in the pulley support element, finally the window regulator is joined to the door structure by means of a threaded screw inside the perforated shaft, so that the assembly is secured to the base by one end of the perforated shaft, the support pulley being situated between the pulley and the base. The solution provided by the pulley support element is based on reinforcing the connection, by increasing its rigidity, and on resting the base of the window regulator on the door structure.

However, in any of these known solutions, although they improve the device's behaviour thanks to an increase in rigidity of the connection, there continues to be a force concentration area, as the support element is fixed only by one end, there continues appearing a torque capable of making the support element tilt and possibly break, due to exceeding the elastic limit of the material.

It is, therefore, necessary to find a way of securing the support element to the base which makes it possible to distribute the forces generated by the cable during operation of the window regulator, thus avoiding their concentration and enabling the use of structures not as rigid as metal and without renouncing the advantages provided by the use of thermoplastic materials, avoiding that those forces exceed the maximums withstood by said materials.

DESCRIPTION OF THE INVENTION

The invention relates to a fixing assembly of a window regulator pulley to a base of thermoplastic material according to claim 1. Preferred embodiments of the fixing assembly are defined in the dependent claims.

An object of the present invention is to provide a fixing assembly for a window regulator pulley to a base of thermoplastic material, which avoids the concentration of forces in a connecting element of a support element of the pulley with the base, thus avoiding the breaking of the support element due to exceeding the elastic limit of the thermoplastic material.

The invention relates to a fixing assembly of a pulley to a base of thermoplastic material, with the base having a connecting area and a support area, the fixing assembly comprising:
  a pulley with an orifice concentric with a rotation shaft of
    the pulley,
  a support comprising two parts:
    a cylindrical shaft and;
    a connecting element which can be connected to the
      base in the connecting area,
  the cylindrical shaft having
    a first end through which it is joined to the connecting
      element so that the cylindrical shaft is connected to the
      base through the connecting element and
    a second end opposite the first end, the cylindrical shaft
      being secured by the first end and the second end, so
      that the pulley is positioned between both ends.

The connecting assembly object of the invention further comprises:
  a support piece comprising:
    a fixing part with a fixing orifice and;
    a support part,
  the cylindrical shaft being secured by its second end to the support piece through the fixing orifice, the support piece in turn being supported by the base through the support part which is provided to rest on the support area, so that the cylindrical shaft is supported through its first end joined to the connecting element and its second end through the support piece, and so that the pulley is retained between the base and the support piece.

The fixing assembly of the invention in this way achieves that the first end and the second end of the cylindrical shaft are fixed, one by the base and another by the support piece. By preventing the tilting of the support element it eliminates the appearance of the torque M and consequently its resulting torque $M_R$ in addition to distributing the reaction R in several points, the forces to withstand in the force concentration points are less, resolving in this way the problem posed.

An object of the invention is also a connecting assembly comprising a base, so that the cylindrical shaft is an extension of the base and the connecting element forms an integral part of the base.

According to another preferred embodiment, the fixing assembly further comprises a cylindrical element in the form of a bushing, preferably metal, positioned between the cylindrical shaft and the pulley.

According to another possible embodiment, the bushing is a part in the form of a neck of the support piece.

In an alternative embodiment the support element is a part of the support piece, so that the cylindrical shaft consists of an extension of the support piece in the form of a neck from the second end and ends in the connecting element formed like a fold, designed to be fixed to the base by means of a screw, in its first end. According to another possible embodiment, the fixing assembly may be pre-assembled to, in a later operation, to be joined to the base.

According to another preferred embodiment, the support area of the base comprises a wall or groove, designed to receive the support part and improve the transmission of forces between both.

The connecting element may be fixed in the connecting area of the base. Or that connecting element may also be riveted in the connecting area of the base. Or the connecting element may be screwed in the connecting area of the base.

Similarly, the second end of the cylindrical shaft may be fixed in the fixing orifice of the support piece. Or said second end may be riveted to the fixing orifice of the support piece. Or said second end may be screwed in the fixing orifice of the support piece.

According to a preferred embodiment, the fixing part and the support part of the support piece are substantially perpendicular to one another.

According to a preferred embodiment, the support piece preferably partially covers the pulley. In the use position of the fixing assembly, the support part of the support piece preferably rests on the support area of the base in an area external to the pulley diametrically opposite the point of contact of the cable with the pulley.

The support device may consist of a formed metal plate.

Other advantages and characteristics of the invention shall become evident from the detailed description below and shall be particularly indicated in the attached claims.

BRIEF DESCRIPTION OF THE DRAWINGS

To complement the description and in order to aid towards a better understanding of the characteristics of the invention, in accordance with a practical embodiment thereof, a set of figures is attached as an integral part of said specification wherein, with illustrative and non-limiting character, the following has been represented:

FIGS. 4, 3E and 5 show another three possible embodiments of the fixing assembly, wherein the shaft of the pulley is formed by an intermediate piece and a support piece, respectively.

FIGS. 6, 7 and 8 show another three possible embodiments of the fixing assembly, wherein the cylindrical shaft is an extension of the thermoplastic base.

DESCRIPTION OF AN EMBODIMENT OF THE INVENTION

Figure 1A:
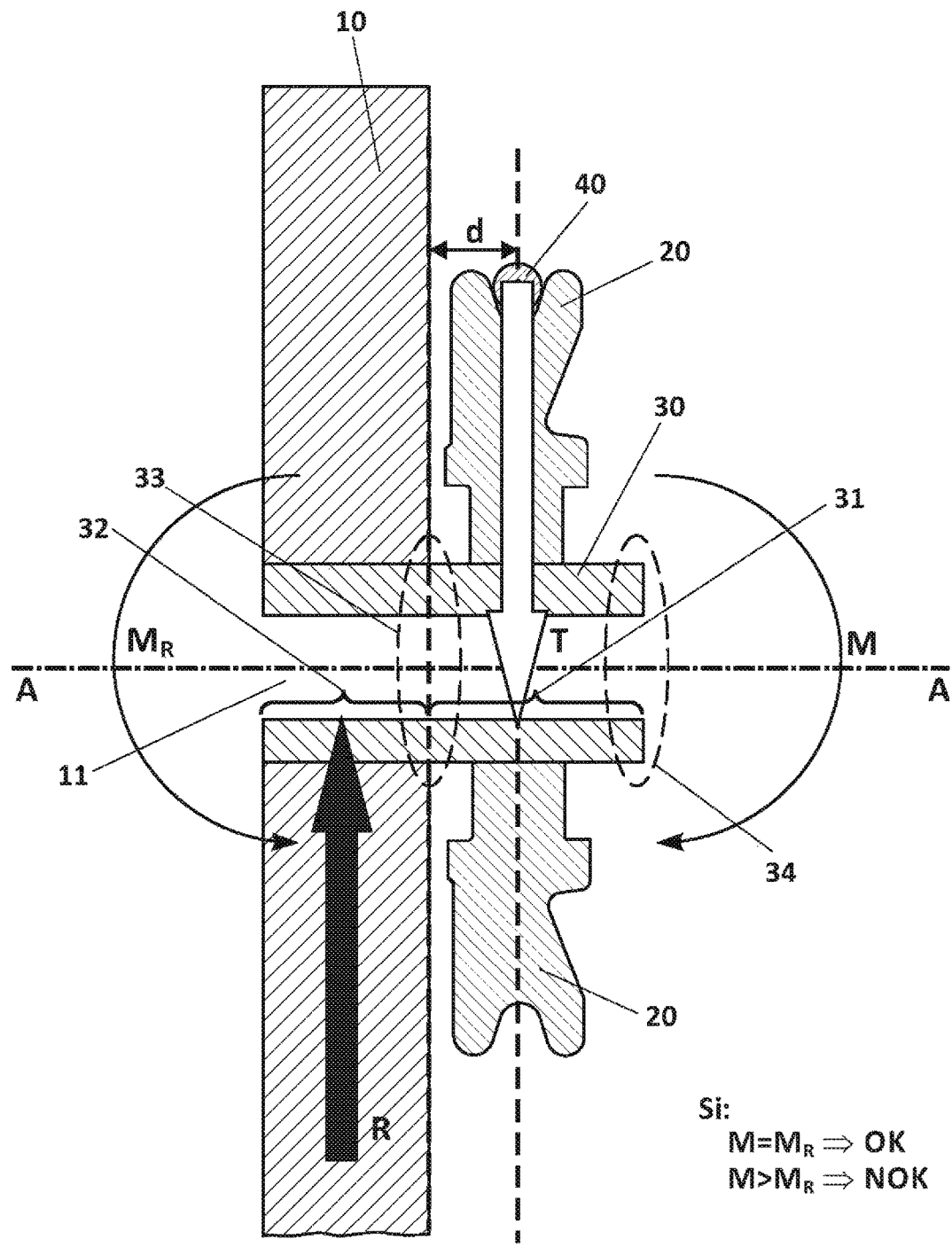
FIG. 1A shows a sectional view of the traditional fixing of the window regulator pulley to the base.
Figure 1B:
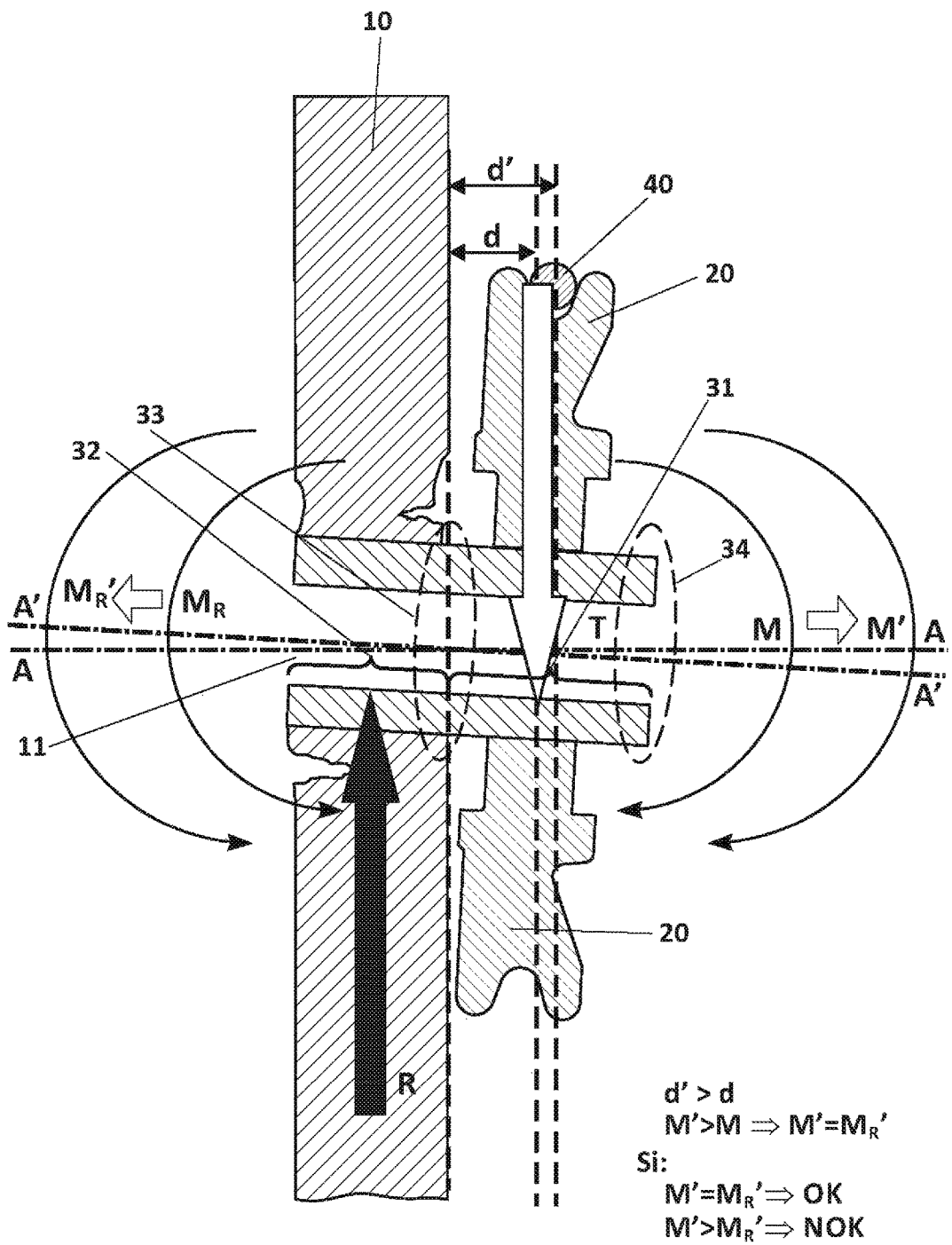
FIG. 1B graphically shows the problem posed by the traditional fixing of FIG. 1A after the forces whereto the pulley and its rotation shaft are subjected to during operation of the window regulator.

Several possible embodiments of the fixing assembly of the invention are described below, which resolve the problem posed by the fixing elements used to fix the pulley of the window regulator to the base which, as shown in FIGS. 1A and 1B, makes the pulley support element tilt due to the force it is subjected to during operation of the window regulator.

To resolve this problem, the invention proposes a fixing assembly which secures the support element whereon the pulley rotates, so that it avoids tilting.

Figure 2:
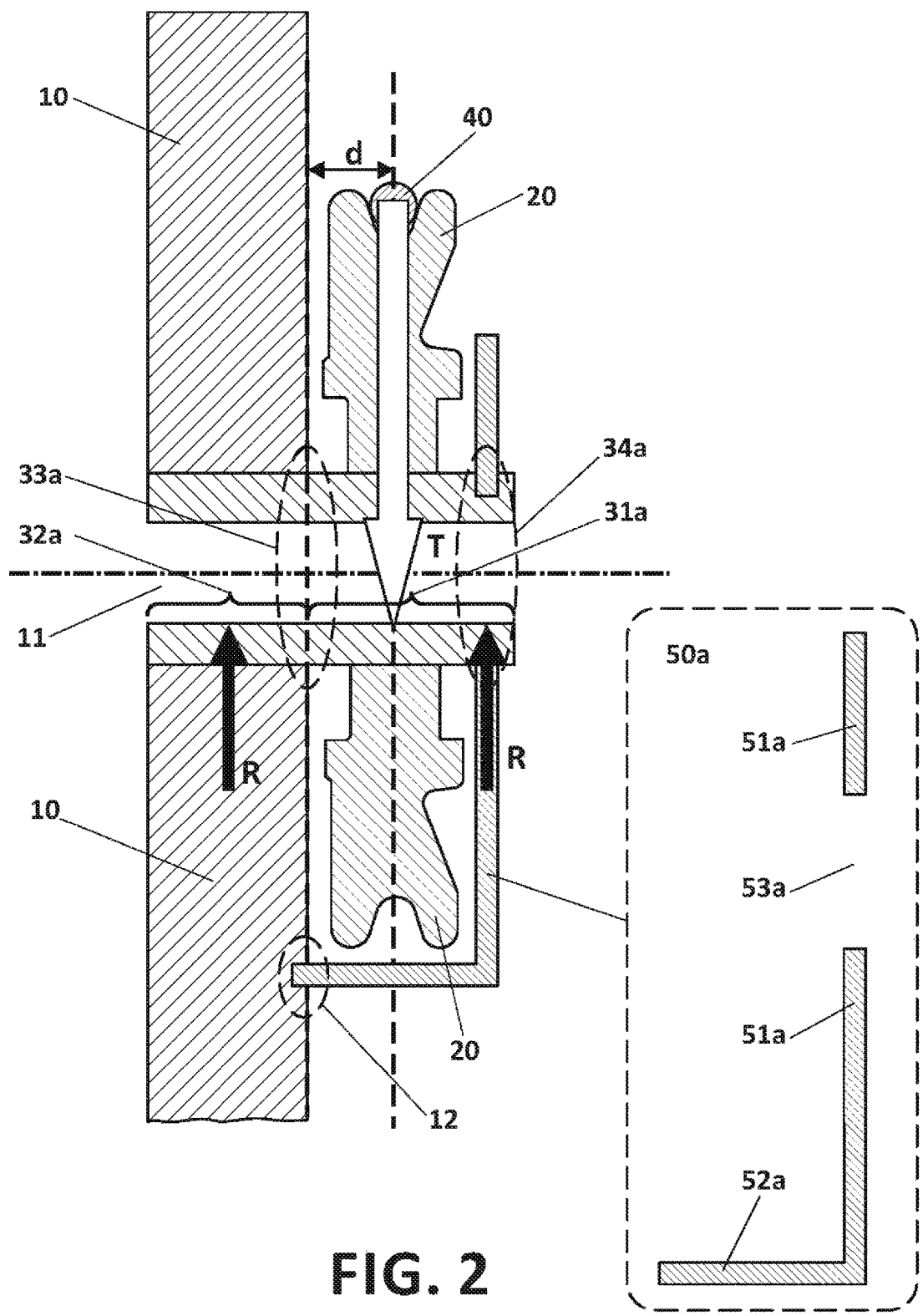
FIG. 2 shows a sectional view of a fixing assembly for a window regulator of a vehicle according to a first preferred embodiment of the invention.

In FIG. 2 a first possible embodiment is shown of the fixing assembly of the invention.

In this FIG. 2 it shows, in section, a base 10 of a window regulator of a vehicle. Although it is not shown specifically in this FIG. 2, a slide member slides on this base which secures and pulls the glass.

The window regulator also has actuation means, which may be manual or motorized (not shown), and movement transmitters, in this case cables 40 which pass through pulleys 20.

In FIG. 2 the pulley 20 is shown mounted on the base 10 made in a plastic material. This pulley 20 rotates around and rests during its operation on a cylindrical shaft 31a, which in the embodiment shown forms part of the support 30a fixed in the connecting area 11 of the base 10 by means of the connecting element 32a. The cylindrical shaft 31a has a first end 33a and a second end 34a. According to the invention, the fixing assembly further comprises a support piece 50a.

In the embodiment shown in this FIG. 2, the support piece 50a is formed by a fixing part 51a and a support part 52a which are substantially perpendicular to one another. The fixing part 51a, which in the position of use partially covers the pulley 20 by its upper surface, has a fixing orifice 53a. This fixing orifice 53a is engaged in the second end 34a of the cylindrical shaft 31a, so that the possible tilting of the support 30a is limited both by the first end 33a and by the second end 34a of the cylindrical shaft 31a, thus preventing the transversal displacement of said support 30a, and in consequence, of the pulley 20. On the other hand, the support part 52a of the support piece 50a, in position of use, is engaged in the support area 12 of the base 10 in an area diametrically opposite the point of contact of the cable 40 in the pulley 20.

In this FIG. 2, the diagram of forces whereto the pulley is subjected is also shown: the force T exerted by the cable 40 and its reaction R distributed throughout the connecting element 32a and in the second end 34a.

In this way, the support 30a is not only secured by the first end 33a to the base 10, but it is also secured by the second end 34a of the cylindrical shaft 31a, by the support piece 50a, thus avoiding that the support 30a tilts.

Figure 2A:
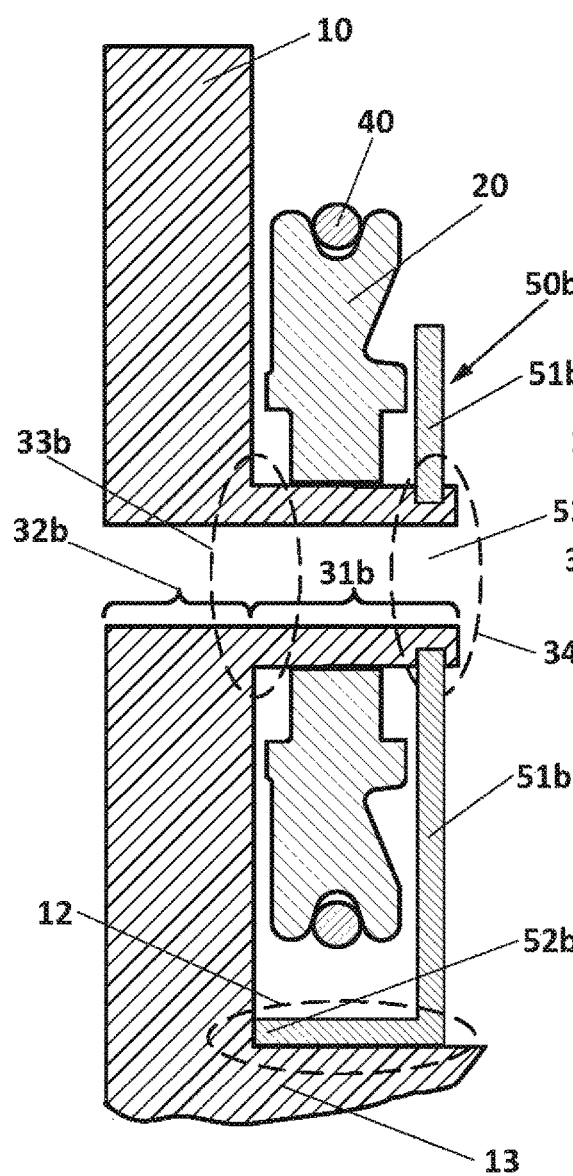
FIGS. 2A and 2B show two possible embodiments of the fixing assembly, wherein the base has an extension which constitutes the cylindrical shaft.

FIG. 2A shows a second possible embodiment of the fixing assembly. In this case the cylindrical rotation shaft 31b of the pulley is formed by an extension, in the form of a neck, of the base 10 and the connecting element 32b forms an integral part of the base 10. In this case the support piece 50b is also fixed by its fixing orifice 53b to the second end 34b of the cylindrical shaft 31b, whilst its support part 52b rests on a perpendicular wall 13 belonging to the support area 12 of the base 10.

Figure 2B:
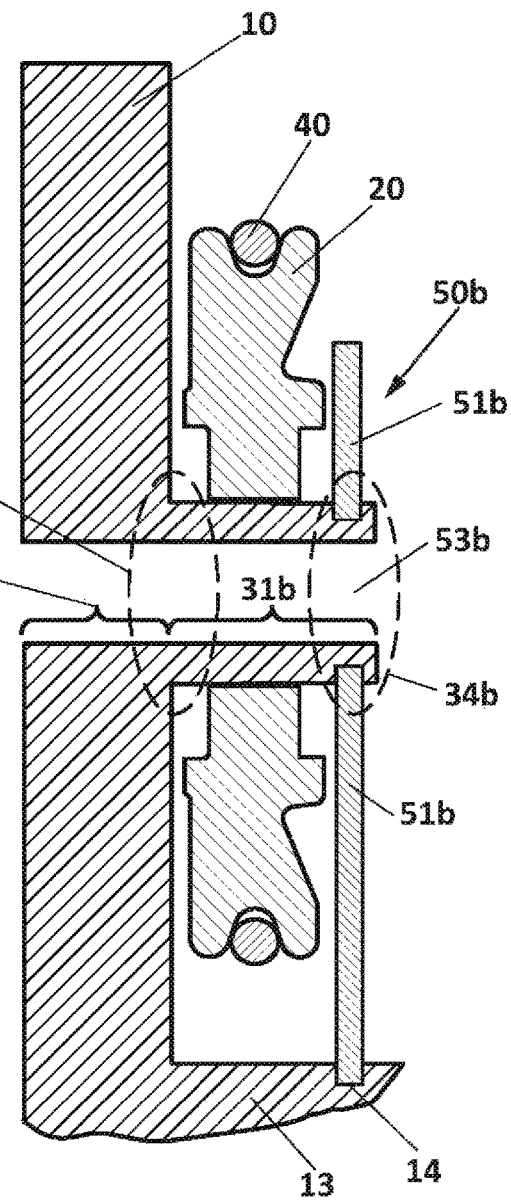

FIG. 2B shows a third possible embodiment of the fixing assembly. As in the embodiment of FIG. 2A, the support piece 50b is also fixed by its fixing orifice 53b of the plate 51b to the second end 34b of the cylindrical shaft 31b formed by extension of the base 10 and the connecting element 32b forms an integral part of the base 10, whilst by its support part 52b it is engaged on a groove 14 made in the wall 13 of the base 10.

Figure 3:
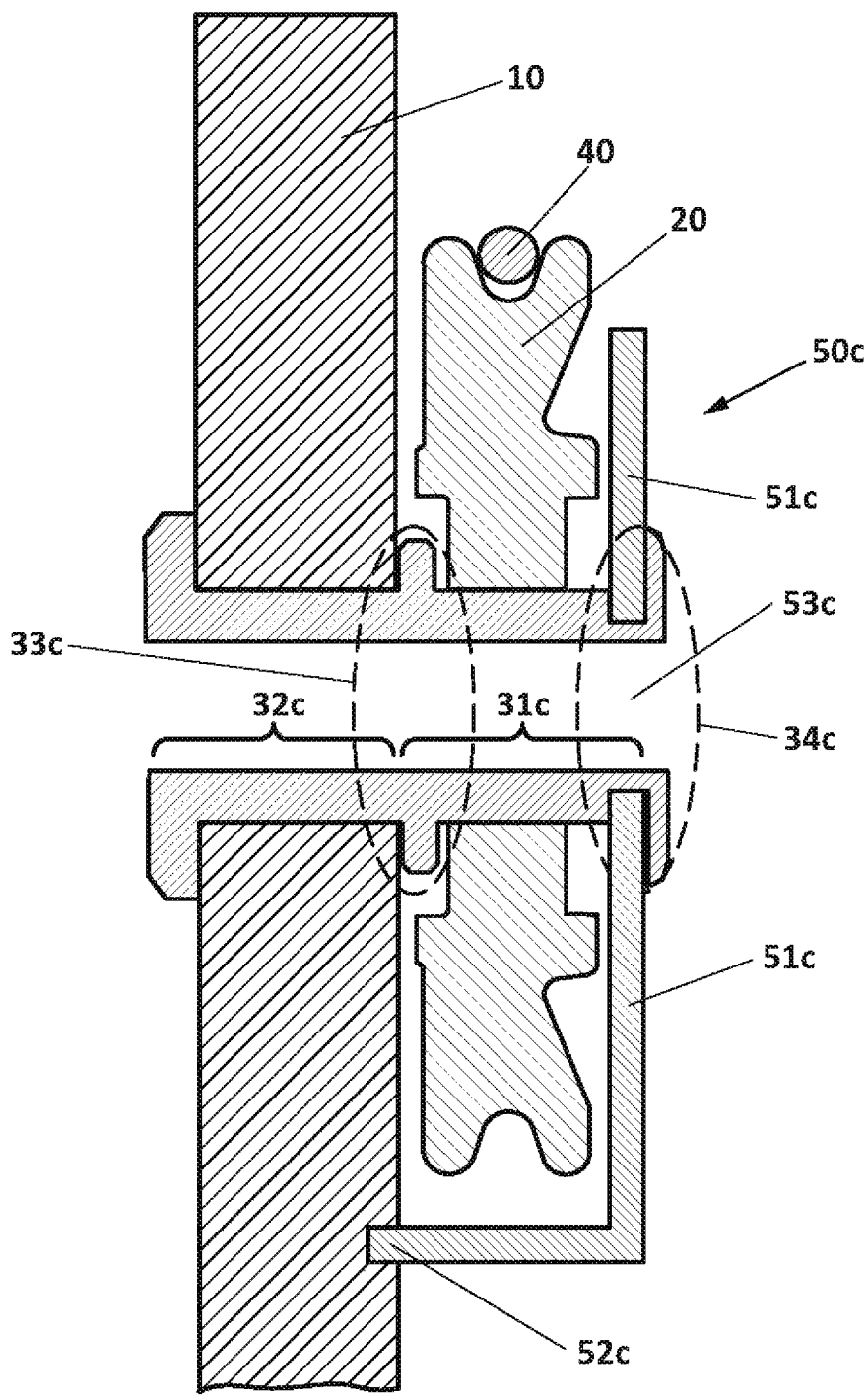
FIG. 3 shows another possible embodiment of the fixing assembly, wherein a rivet is used as pulley shaft.
Figure 3A:
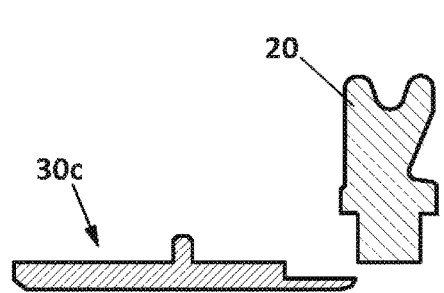
FIGS. 3A, 3B, 3C and 3D show an assembly sequence of the fixing assembly shown in FIG. 3.
Figure 3B:
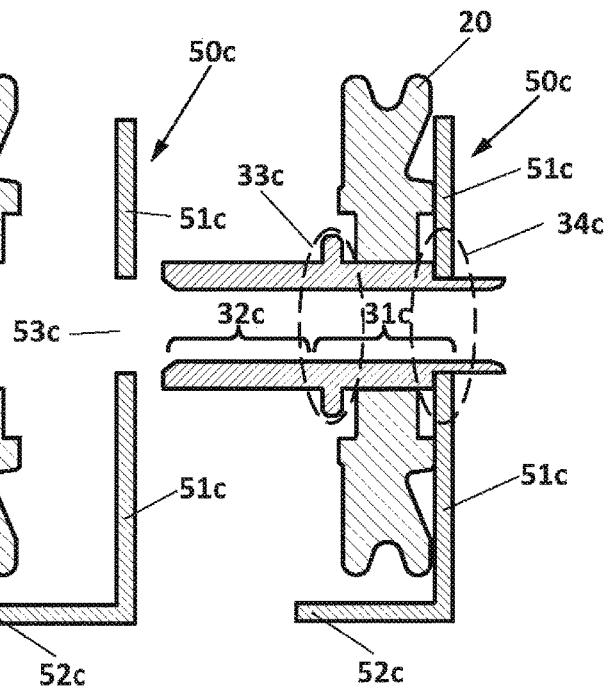

In FIG. 3 another possible embodiment is shown of the fixing assembly of the invention, showing in FIGS. 3A-3D the mounting sequence thereof. In FIG. 3A the following are shown: the support piece 50c (which may be similar to that shown in FIG. 2), the pulley 20 and the support 30c, which in this preferred embodiment is a rivet, before its mounting on the base 10.

Figure 3C:
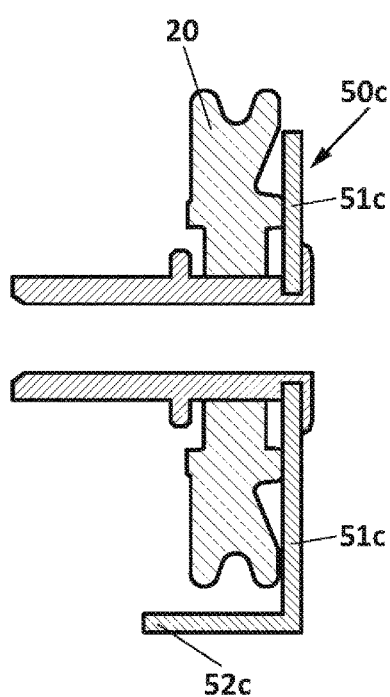

The pulley 20 is mounted on the support 30c containing the connecting element 32c and the cylindrical shaft 31c, with its first end 33c and its second end 34c in the cylindrical shaft 31c. Next, the assembly is covered with the support piece 50c, this has a fixing part 51c with a fixing orifice 53c and a support part 52c. The fixing orifice 53c of the support piece 50c is fixed by the second end 34c, after having riveted the support 30c by the corresponding side (FIG. 3C). Finally, the fixing assembly is fixed on the base 10 riveting the opposite end of the support element 30c (FIG. 3).

Figure 3D:
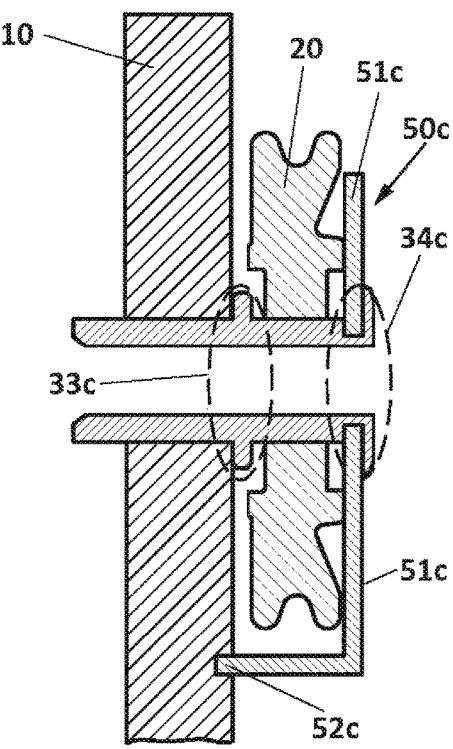

As can be better seen in FIGS. 3 and 3D, after having mounted the fixing assembly on the base 10, the pulley 20 is retained between said base 10 and the support piece 50c. The cylindrical shaft 31c is fixed by its first end 33c to the base 10; the support piece 50c is riveted in the second end 34c, in this way preventing the transversal displacement of the cylindrical shaft 31c.

In other words, this embodiment allows the pre-mounting of the fixing assembly formed by the pulley 20, of the support piece 50c and of the support 30c and to take it pre-mounted to finally rivet the base 10 of the window regulator by the corresponding side of the connecting element 32c of the support 30c.

This embodiment has the added advantage that both the support piece 50c and the support 30c (rivet) are simple pieces, which makes their manufacturing easier.

FIG. 3E shows another possible embodiment of the fixing assembly similar to that shown in FIG. 3; on this occasion, the connecting element 32d is joined to the base 10 by means of the screw 60d.

FIG. 4 shows another possible embodiment of the fixing assembly, wherein a support 30e in the form of a rivet contains the cylindrical shaft 31e and a joining part 32e, so that the first end 33e is screwed to the base (10) by a screw 60e. For its part, the fixing orifice 53e of the support piece 50e is riveted in the second end 34e of the cylindrical shaft 31e. Through its support part 52e, the support piece 50e is engaged on the support area 12 of the base 10.

Figure 5:
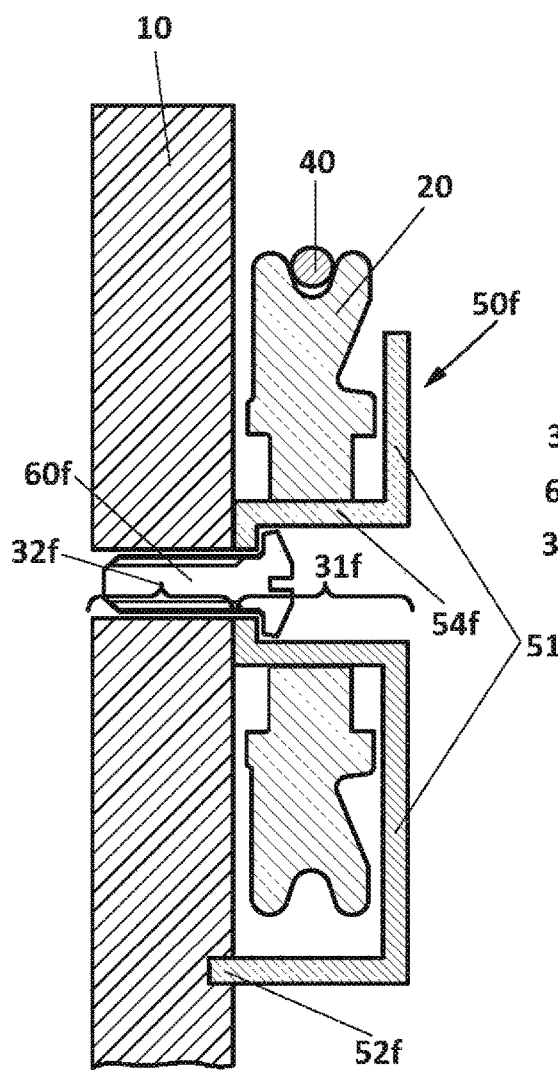

In the embodiment of the fixing assembly shown in FIG. 5 the support is a part of the support piece 50f, so that the cylindrical shaft (31f) consists of a portion/extension of the support piece (50f) in the form of a neck from the second end (34f) and ends in the connecting element (32f) formed like a fold, designed to be fixed to the base (10) by means of the screw (60f), in its first end (33f).

Figure 6:
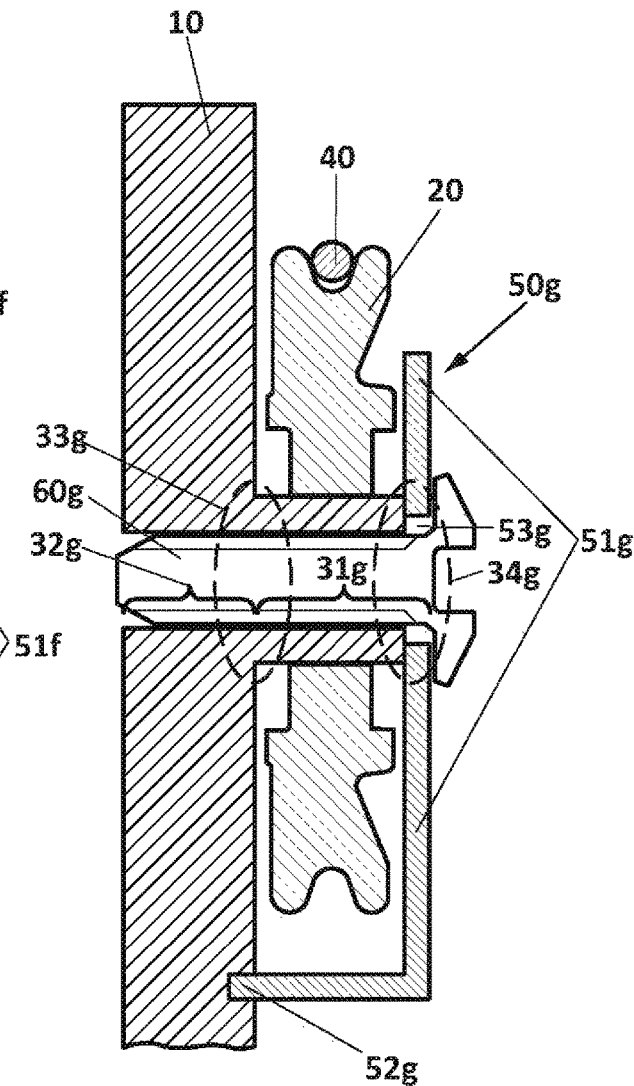
Figure 9:
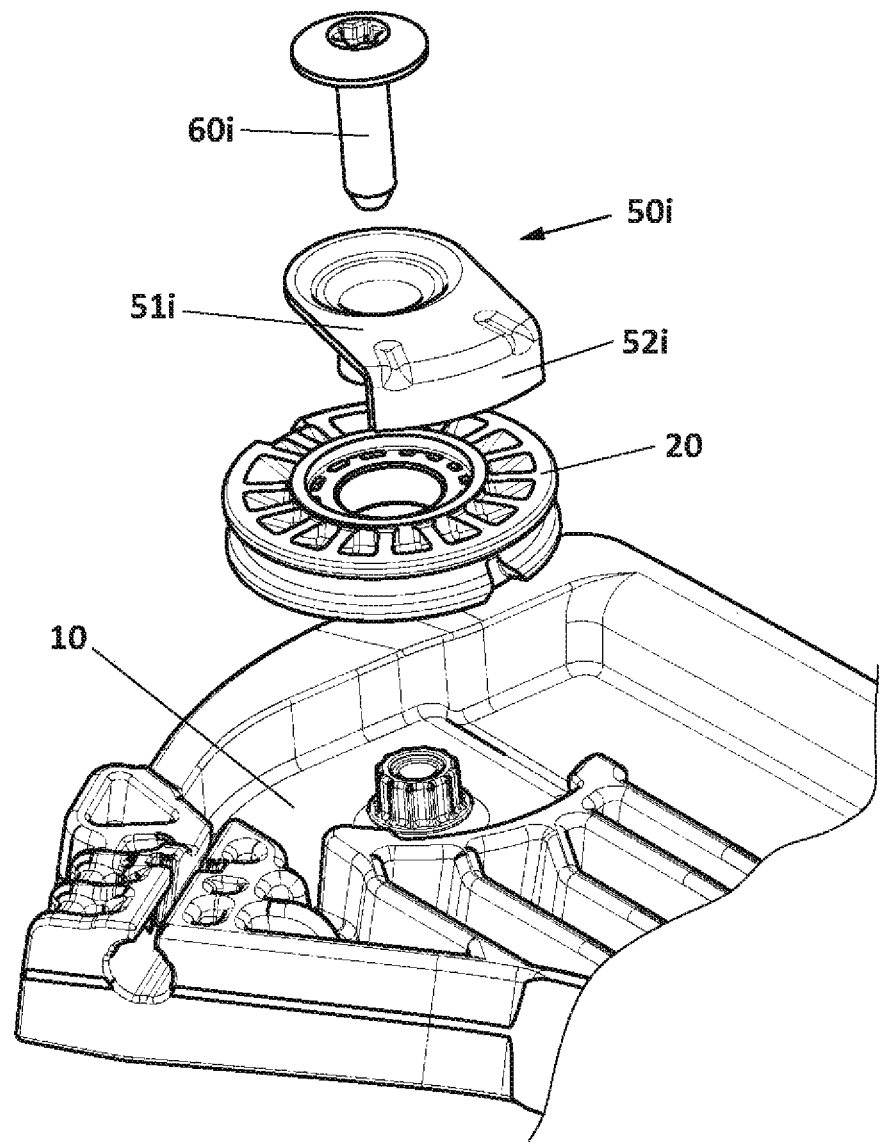
FIG. 9 shows an exploded perspective of the solution shown in FIG. 8.
Figure 10:
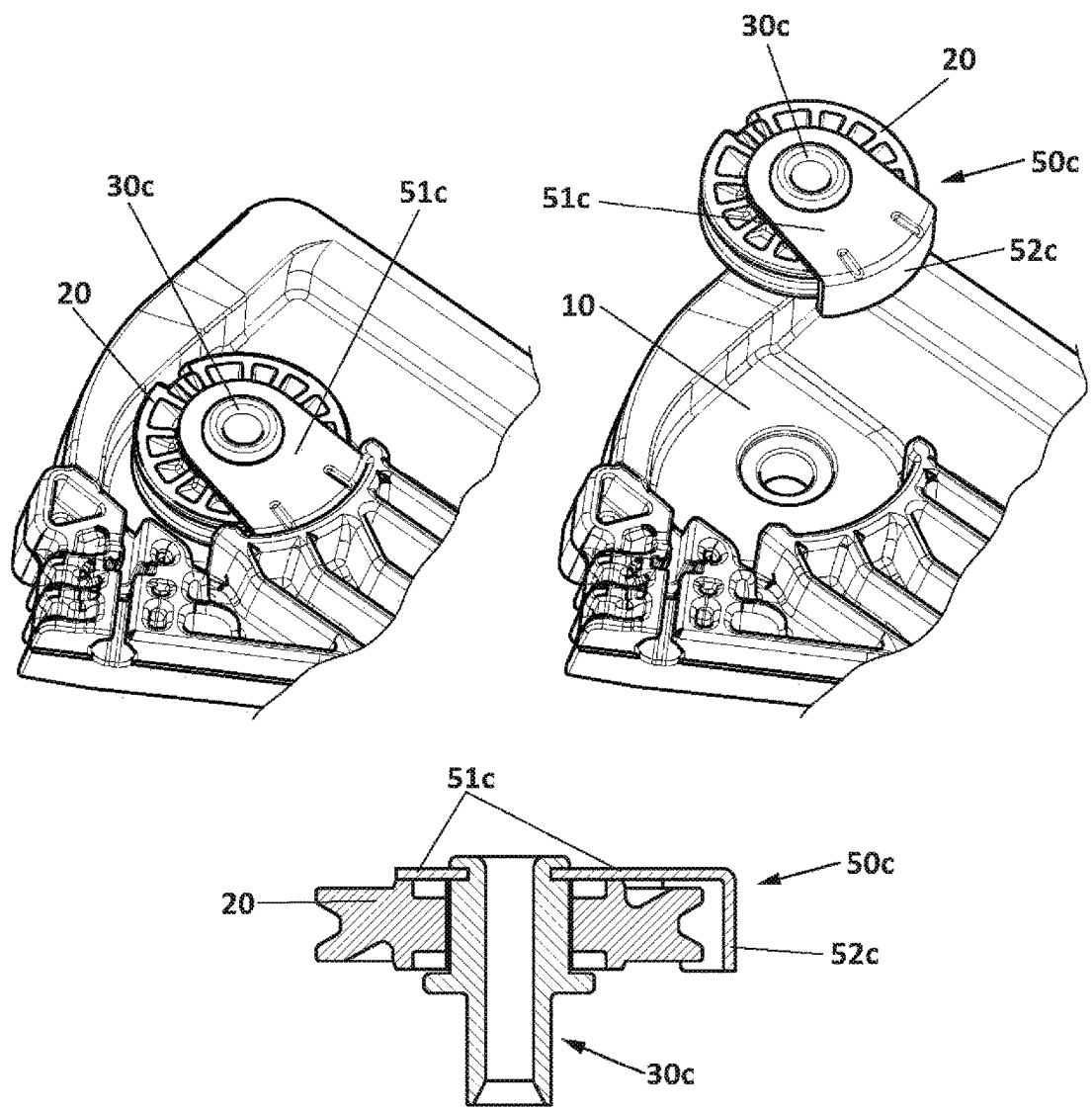
FIG. 10 shows a perspective of the solution shown in FIG. 3.

In the embodiment of the fixing assembly shown in FIG. 6, the cylindrical rotation shaft 31g of the pulley is formed by an extension of the base 10 in the form of a neck and the connecting element 32g forms an integral part of the base 10. The fixing assembly further comprises a support piece 50g such as that shown in FIG. 2, 2A, 3 or 4, fixing in this case the orifice (53g) of the support piece (50g) by a screw 60g, in this way, the cylindrical shaft being fixed by its first end 33g to the base 10 and screwed by its second end 34g to the support piece 50g by means of the screw 60g.

In FIG. 7 a variant is shown of the embodiment shown in FIG. 6, wherein the fixing assembly further includes a reinforcing bushing 70, which is preferably metal, which is introduced between the pulley 20 and the cylindrical shaft 31h of the base 10 in the form of a neck.

In the embodiment shown in FIG. 8, it is the support piece 50i which has a part in the form of a neck 54i which remains between the pulley 20 and the cylindrical shaft 31i of the base 10. The cylindrical shaft 31i is fixed by its first end 33i to the base 10 and screwed by its second end 34i to the support piece 50i by means of the screw 60i.

In any of the different embodiments shown of the fixing assembly of the invention, the cylindrical rotation shaft is secured by its two ends, distributing the forces and avoiding the tilting of the support element by its first joining end to the base.

In this text, the word "comprises" and variations thereof (such as "comprising", etc.) should not be taken as being exclusive, that is, they do not exclude the possibility that what is described may include other elements, steps, etc.

Furthermore, the invention is not limited to the specific embodiments described above, but also covers, for example, variations that might be made by the average person skilled in the art (for example, as regards the choice of materials, dimensions, components, configuration, etc.), within the bounds of what can be inferred from the claims.

The invention claimed is:

1. A fixing assembly for fixing a window regulator pulley to a base of thermoplastic material, the fixing assembly comprising:
   (I)—the pulley having an orifice concentric with a rotation axis of the pulley
   (II)—the base having a connecting area and a support area;
   (III)—a support comprising:
   a cylindrical shaft having an orifice and;
   a connecting element connected to the base in the connecting area, the cylindrical shaft having:
   a first end by means of which it is joined to the connecting element so that the cylindrical shaft is connected to the base through the connecting element, and
   a second end opposite the first end, the cylindrical shaft being secured by the first end and the second end so that the pulley is positioned between both ends;
   (IV)—a support piece comprising:
   a fixing part with a fixing orifice, and a support part, the cylindrical shaft being secured by its second end to the support piece through the fixing orifice, the support piece being in turn supported by the base through the support part which is designed to rest on the support area, so that the cylindrical shaft is supported through its first end joined to the connecting element and its second end through the support piece, and so that the pulley is retained between the base and the support piece, wherein the cylindrical shaft is configured as an extension of the base, and the connecting element forms an integral part of the base, wherein the fixing assembly further comprises
a cylindrical element in the form of a bushing between the cylindrical shaft and the pulley, and wherein the support area of the base comprises a wall or groove configured to receive the support part to improve the transmission of forces between the cylindrical shaft and the pulley.

2. The fixing assembly according to claim 1, wherein said bushing is a neck-shaped portion of the support piece.

3. The fixing assembly according to claim 1, wherein the connecting element is engaged, screwed or riveted, in the connecting area of the base.

4. The fixing assembly according to claim 1, wherein the second end of the cylindrical shaft is engaged, screwed or riveted, in the fixing orifice of the support piece.

5. The fixing assembly according to claim 1, wherein said fixing part and said support part of the support piece are substantially perpendicular to one another.

6. The fixing assembly according to claim 1, wherein the support piece partially covers the pulley.

7. The fixing assembly according to claim 1, wherein said support part can rest on the base in an area external to the pulley, diametrically opposite the point of contact of a cable with the pulley.

8. The fixing assembly according to claim 1, wherein the support piece consists of a formed metal plate.

* * * * *